May 8, 1945.   J. S. HOWARD   2,375,555
CAMERA
Filed June 23, 1942   3 Sheets-Sheet 1

INVENTOR
Jasper S. Howard
BY
ATTYS

May 8, 1945.   J. S. HOWARD   2,375,555
CAMERA
Filed June 23, 1942   3 Sheets-Sheet 3

INVENTOR
Jasper S. Howard
BY
*Corbett & Corbett*
ATTYS

Patented May 8, 1945

2,375,555

UNITED STATES PATENT OFFICE 2,375,555

CAMERA

Jasper S. Howard, Sacramento, Calif., assignor of one-half to Thomas D. Bishop, Sacramento, Calif.

Application June 23, 1942, Serial No. 448,087

1 Claim. (Cl. 95—31)

This invention is an improvement in commercial cameras, and in particular the invention is directed to an improved camera which is arranged for loading with commercial roll film, of either negative or positive type, and which film is available on the market in reel-supported rolls of substantial footage.

The principal object of the present invention is to provide a commercial camera adapted to be loaded with roll film as above, and arranged so that a single exposure on the film may be cut from the roll and removed from the camera for development; this being accomplished by mechanism mainly within the camera, and without in any way disturbing or exposing the remainder of the roll of film.

A further object of the invention is to provide a novel camera designed for use with commercial roll film obviating the need of film packs or plates, and yet producing single exposure film sections as above.

It is also an object of the invention to provide a camera, designed for loading with commercial roll film, which is easy to operate and arranged so that the film feed is positive and smooth; the film for each exposure being fed in a unique manner from the reel into face to face and covering relation to a ground glass, upon which the image has previously been focused.

An additional object of the invention is to provide a camera, designed for loading with commercial roll film, which includes, in unique assembly, a film exposing compartment, a ground glass focusing plate therein, means to selectively feed the film from the roll in overlying face to face relation to said ground glass, and manually actuated means to cut off each exposed section of the film; there being a container into which the cut off, exposed section of film is deposited, said container being adapted for removal from the camera with the cut off section of film enclosed in the container against light entry and for carrying to the laboratory for development.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Figure 5 is a fragmentary sectional elevation illustrating the normal position of the container for receiving cut sections of film.

Figure 1:
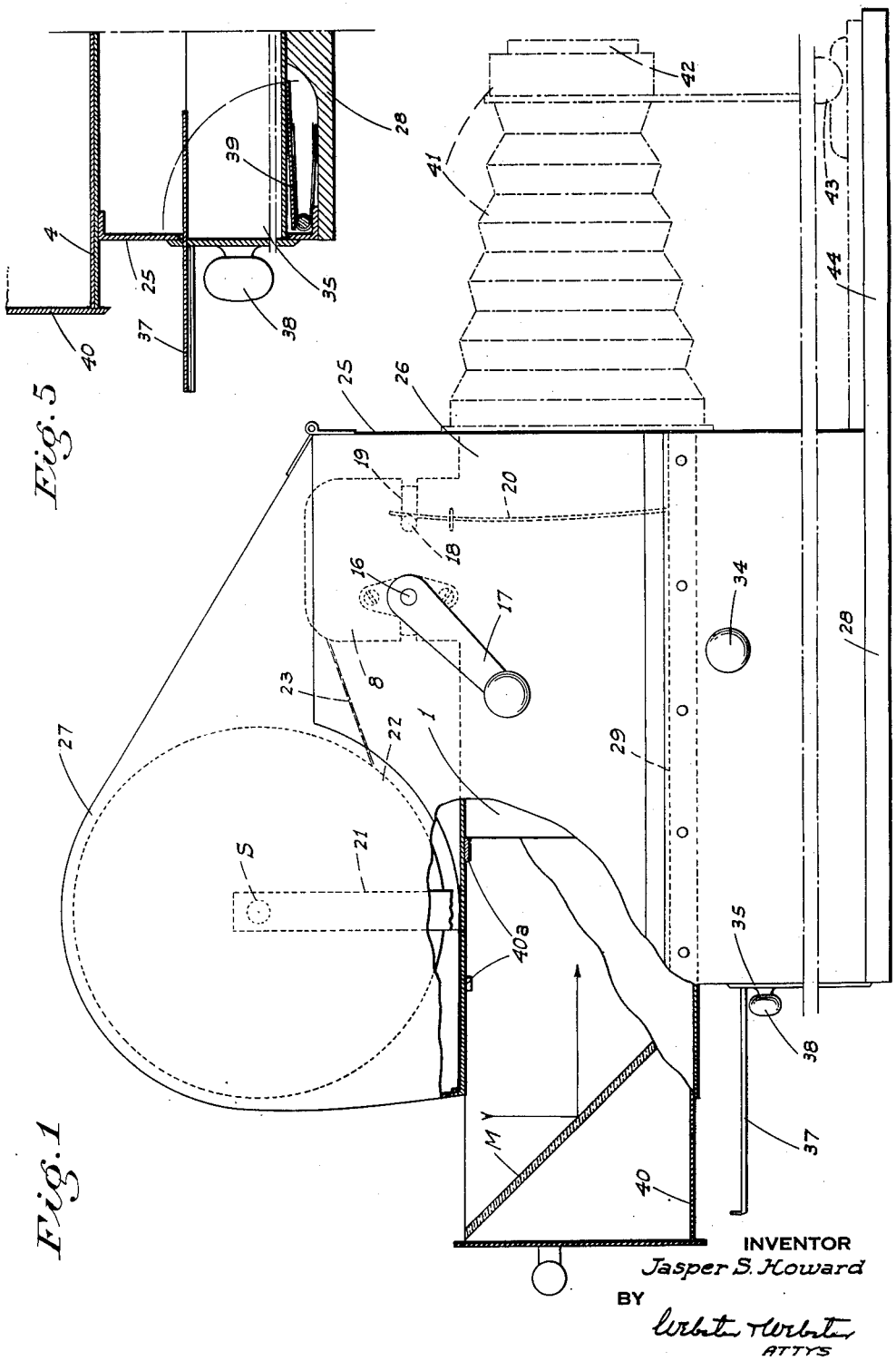
Figure 1 is a side elevation of the improved camera, partly broken out and in section.
Figure 2:
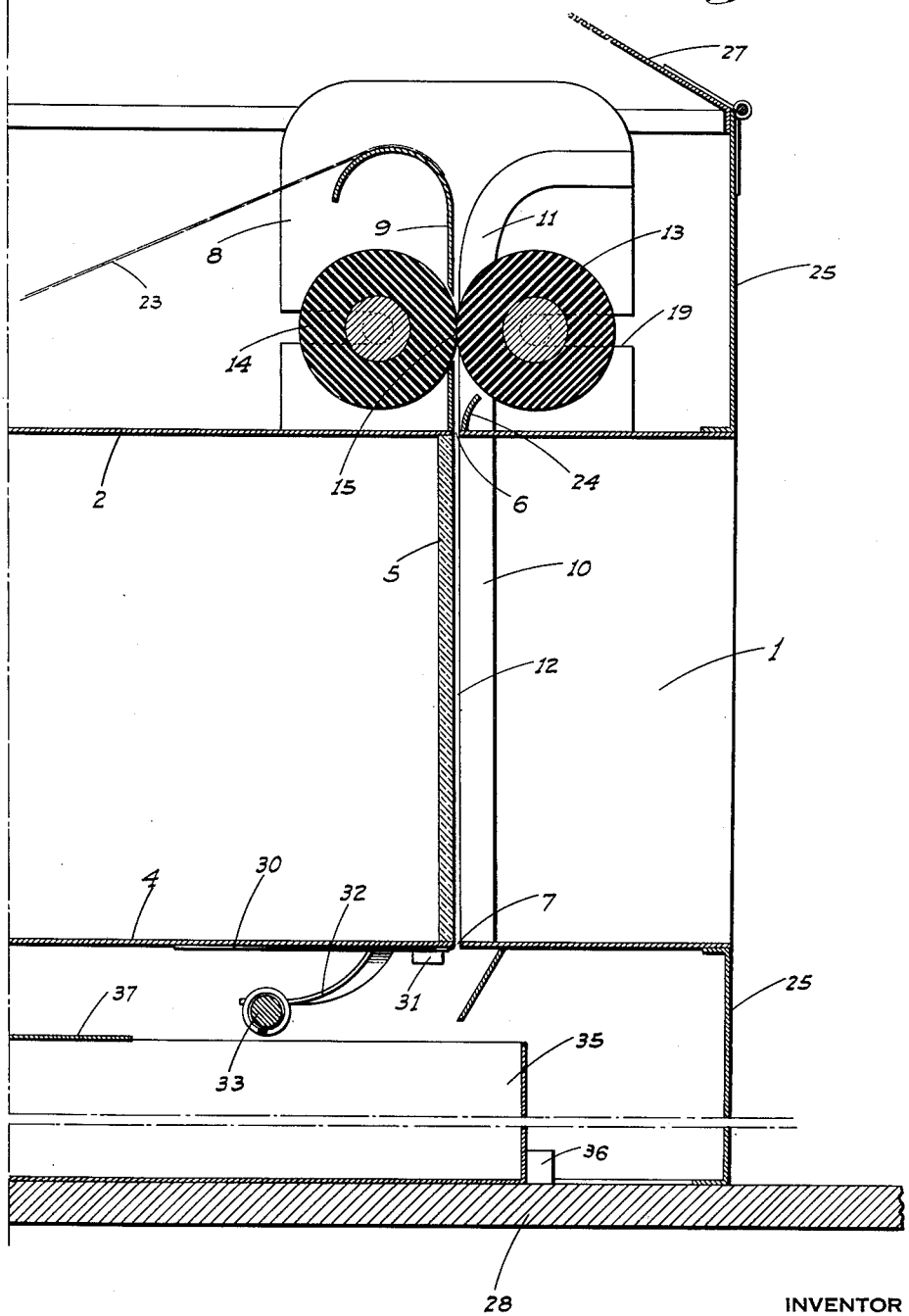
Figure 2 is a fragmentary sectional elevation of the camera.
Figure 3:
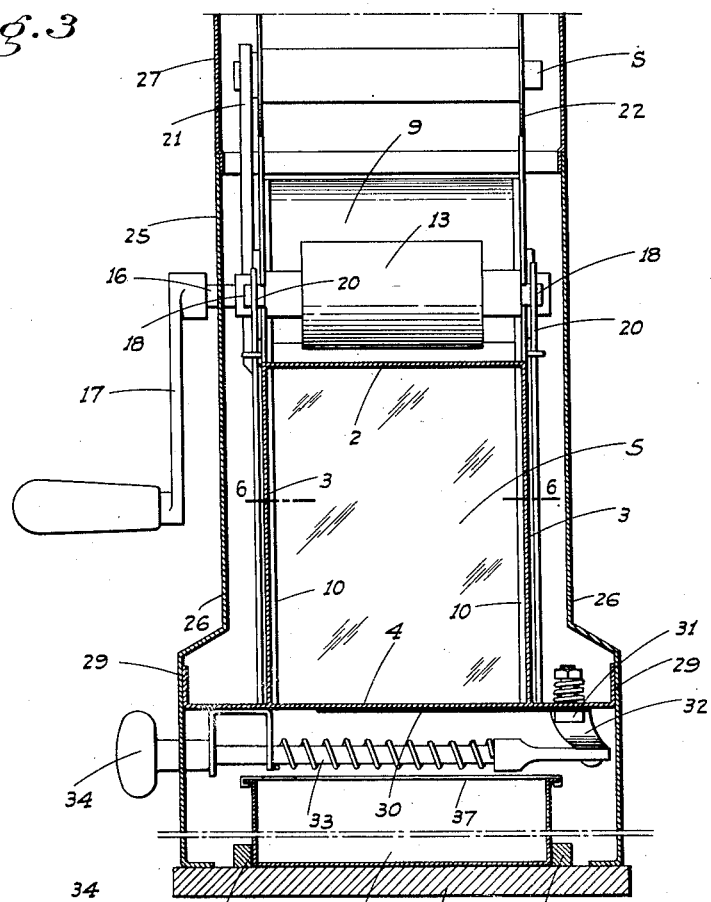
Figure 3 is a cross-section on line 3—3 of Fig. 1.
Figure 4:
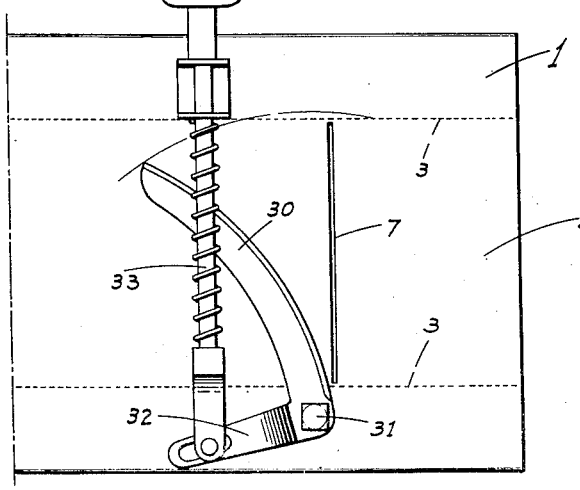
Figure 4 is a fragmentary bottom plan view showing the film cut-off knife and actuating rod assembly.

Referring now more particularly to the characters of reference on the drawings, the camera comprises a longitudinally extending initially open-ended film exposing compartment 1; said compartment being rectangular in cross section and including a top 2, sides 3 and a bottom 4. Adjacent but short of the forward end of the compartment 1, the latter is fitted with a full-size transverse pane 5 of ground glass; there being a film entry slot 6 through the top 2 transversely of the latter and immediately ahead of ground glass 5. A corresponding film outlet slot 7 is cut through the bottom 4 transversely likewise immediately ahead of ground glass 5 and in alinement with slot 6.

Figure 6:
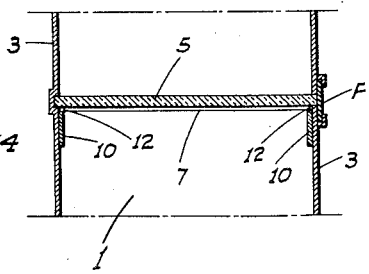
Figure 6 is a fragmentary sectional plan on line 6—6 of Fig. 3.

As shown in Fig. 6, the glass is held in grooves in the side walls 3, one groove being normally closed by a vertically removable slide plate P, which when removed allows the glass to be withdrawn laterally.

The compartment 1 above the ground glass 5 is formed with upstanding side extensions 8 of substantial length and height, and a film guide plate 9 extends in fixed relation transversely between said side extensions above the top 2 and in the vertical plane of the face of ground glass 5; the upper end portion of guide plate 9 being curved rearwardly, as shown. Guide strips 10 are secured to the sides 3 and side extensions 8 in slightly spaced parallel relation to and ahead of ground glass 5 and guide plate 9 respectively, whereby to form film guide channels 12 which extend from a point a considerable distance above top 2 downward to bottom 4. Slots 6 and 7 register with said channels. The upper ends of guide strips 10 curve forwardly as shown at 11, whereby the upper portions of said strips and guide plate 9 converge in a downward direction relative to each other.

A pair of transverse, resilient rolls 13 and 14 respectively are removably journaled between side extensions 8 adjacent but above top 2, said rolls frictionally engaging each other at a point 15 which lies in the vertical plane of film guide channels 12; the guide plate 9 being cut away to the extent necessary to permit a portion of the periphery of roll 14 to project therethrough. The roll 14 has an extended shaft 16 at one end on which a crank 17 is affixed. The roll 13 is a freely journaled roll and includes end trunnions 18 which are removably engaged in horizontal notches 19 in the side extensions 8; said trunnions being normally but releasably held in said notches by suitable releasable springs such as upstanding spring fingers 20.

A vertical supporting arm 21 is secured on and upstands from the compartment 1 adjacent the rear end and on one side thereof, said arm having a horizontal spindle S arranged to support a reel 22 of commercial roll film 23. The film feeds from said reel to the curved upper end of guide plate 9, whence it passes in guided relation in channels 12 between rolls 13 and 14 downward through slot 6. From slot 6 the channels 12 continue to guide the film and to hold the same in substantially face to face engagement with ground glass 5. A relatively short and diverging transverse guide flange 24 upstands from top 2 ahead of slot 6 and assures that the film passes through slot 6 after leaving the rolls 13 and 14, which drive the film upon rotation of hand crank 17.

The above described assembly, except crank 17, is mounted within a generally conforming and light-tight case 25 which includes sides 26, a top lid 27 which permits placement and removal of reel 22 and threading of the film, and a base 28 disposed some distance below bottom 4 of compartment 1; said bottom 4 of the compartment being extended beyond its sides 3 and flanged as at 29 for connection with the sides 26 of the case. The compartment 1 and the assembly mounted thereon may of course be secured within case 25 in any suitable manner.

A film cut-off knife 30 is pivoted, as at 31, to the underside of bottom 4 beyond one end of slot 7 for sweeping motion in engagement with said bottom 4 and across said slot. A radial actuating lever 32 formed with the knife is pivotally connected to a spring-returned pull rod 33; said rod extending transversely of the case and projecting to a termination exteriorly thereof. The pull rod 33 at its outer end is fixed with a finger knob 34.

Below the pull rod 33 but within the case 25 there is a longitudinally extending removable container or box 35 for catching cut sections of film; said container riding on base 28 and guided between rails 36 on said base. The box 35 extends into the case 25 from an opening in one end thereof and below the compartment 1 in light-tight relation to the latter. The box includes a top slide 37 which is normally drawn out a substantial portion of its length as shown in Fig. 1, so that the box is open sufficiently to receive a cut section of film. A pull knob 38 is secured to the outer end of said box. The opening through which the box projects into the case 25 is automatically closed, upon removal of the box, by a spring actuated flap door 39 mounted on base 28 inside the case 25.

At the rear end, the compartment 1 is normally closed by a light-tight longitudinally slidable box 40 of rectangular drawer-like construction, open on top and at its inner end, and containing a reflecting mirror M for focusing purposes, which is set in the box on a slope as shown. When the box is pulled out to its limit as determined by stop means 40a, the operator can see the image on the ground glass 5 by looking down onto mirror M. The front end of said compartment is arranged in connection with a lens unit as for example a focusing mount 41 which includes a lens and shutter element 42 supported in longitudinal adjustable relation by any suitable means, indicated generally at 43, on an extension 44 of base 28.

In use, the camera is supported on a tripod or the like and the slide box 40 is pulled out, and the operator adjusts the lens 42 so that the image of the subject is focused on ground glass 5. The box 40 is then closed and the film 23, which previously has been clear of the ground glass, is fed downward until said glass is fully covered. The diameter of rolls 13 and 14 is such that with one complete forward revolution of said crank 17, the correct amount of film is fed through slot 6 to fully cover ground glass 5. Thereafter, the film covering the ground glass is exposed through the lens and shutter unit 42. With a further full rotation of crank 17 forwardly, the exposed section of film passes through the outlet slot 7. The operator then pulls on knob 34 which causes the knife 30 to sweep across slot 7 below the latter, cutting off said exposed section of the film, which falls into box 35. If the operator desires to make a further exposure before removing the cut section of film from the camera, he rotates crank 17 once in a reverse direction, which withdraws the film from within the compartment and clear of ground glass 5, permitting further focusing. Thereafter the process above described is repeated.

After the cut film section or sections, as the case may be, have been deposited in box 35, the slide 37 is pushed inward, closing the top of said box. The box, by the use of pull knob 38, may then be withdrawn from the camera without light damage to the film sections therein. As said box is withdrawn the spring-urged flap door 39 instantaneously closes the opening in the case 25 from which the box is drawn. The box, after being carried to the laboratory and emptied, is of course returned to normal position in the camera, as shown in Fig. 1, with the slide 37 pulled out to a substantial extent, so that further cut sections of film may fall into the box with continued use of the camera.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

A camera which includes in combination three light tight compartments disposed immediately adjacent one another, the center one of which comprises the film exposure compartment provided with shutter and focus means, a ground glass disposed transversely across said film exposure compartment, the walls of such compartment having alined slots lying immediately adjacent the plane of one face of the glass and which slots open into adjacent compartments, one of such adjacent compartments comprising a roll film retaining compartment and the other comprising a cut film receiving compartment, means for mounting a roll of film in the roll film retaining compartment, a pair of co-acting film advancing rollers disposed in said last named compartment with their co-acting faces disposed in substantial alinement with the adjacent slot leading into the film exposure compartment, means to guide film from the film roll and between said rollers, means to rotate one roller to advance the film through the rollers and such slot and across the face of the ground glass and thence through the other slot into the cut film compartment, cutting means operable within the last named compartment to sweep across the slot opening into said compartment to cut film advanced into such compartment and allow it to deposit in such compartment, the circumference of the advancing roller being equal in length to the width of the ground glass whereby with one revolution of the roller in one direction the film will be advanced an amount sufficient to cover the glass and with one revolution of the roller in the opposite direction the film will be retracted an amount sufficient to clear the glass of film during focusing of the camera, after the cutting off of such film as may have been advanced into the cut film compartment.

JASPER S. HOWARD.